United States Patent Office

2,914,565
Patented Nov. 24, 1959

2,914,565
PRODUCTS HAVING AMBERGRIS AROMA AND A PROCESS OF MAKING SAME

Günther Ohloff, Holzminden an der Weser, Germany, assignor to Dragoco Gerberding & Co., G.m.b.H., Holzminden an der Weser, Germany, a corporation of Germany No Drawing. Application July 13, 1955
Serial No. 521,928

Claims priority, application Germany July 16, 1954

12 Claims. (Cl. 260—598)

The present invention relates to products useful in cosmetics and perfumery and more particularly to oxygen containing products having an ambergris aroma and to a process of making same.

The polyterpene sclareol has previously been oxidized to the corresponding γ-lactone by means of chromium trioxide. Said lactone can be converted into an oxide by reduction and subsequent splitting off of water or into bicyclohomofarnesol by an interchange of ester radicals, splitting off of water, and reduction. Both compounds, the oxide as well as bicyclohomofarnesol have an ambergris aroma. These products, however, do not represent a satisfactory substitute for ambergris.

It is one object of the present invention to provide a new substitute for ambergris, which substitute is derived from sclareol and similar tetramethyl decahydronaphthalene derivatives which have a methyl group in each of the 2- and 9-positions and which contain 2 geminate methyl groups in 5-position.

Another object of the present invention is to provide a simple and effective process of converting sclareol and similar tetramethyl decahydronaphthalene derivatives into compounds having ambergris aroma and being useful in cosmetics and perfumery as satisfactory substitutes for ambergris.

Other objects of the present invention and advantageous features thereof will become apparent as the description proceeds.

In principle, the process according to the present invention consists in subjecting sclareol or similar tetramethyl decahydronaphthalene derivatives to the action of oxidizing agents under gentle conditions so that formation of the γ-lactone is incomplete. The resulting incomplete oxidation products have a much more pronounced ambergris aroma than those obtained when completely oxidizing sclareol to the γ-lactone. Said ambergris aroma can be still further increased by subjecting said incomplete oxidation product to a destructive distillation, preferably in a vacuum.

Incomplete oxidation according to the present invention may, for instance, be carried out by using chromium trioxide as an oxidizing agent in a solution of acetic acid. Preferably, 6 atoms of oxygen are, in such case, reacted at an increased temperature with 1 mol of sclareol.

When carrying out the oxidation with alkali dichromate in a mineral acid such as sulphuric acid, 1 to 7 atoms of oxygen may be reacted with 1 mol of sclareol. Best results will be obtained at a reaction of 5 atoms of oxygen at a temperature of 50° C. The active oxygen may also be generated from chromium trioxide in a solution of mineral acid, such as sulphuric acid.

It is quite surprising that oxidation of sclareol can be controlled and directed, by selection of suitable oxidation conditions, to the formation of liquid products having a pronounced ambergris aroma although the yield of γ-lactone is considerably reduced.

By a further advantageous embodiment of the present invention it is possible to still more intensify the ambergris aroma of the reaction product obtained by gentle oxidation. For this purpose the oxidation product is stored for a prolonged period of time whereby acetic acid is split off. Splitting off of acetic acid and, thus, intensifying the ambergris aroma of the resulting products is accelerated by the addition of 10% catalysts and/or by dry distillation in a moderate vacuum.

When oxidizing sclareol, for instance, with an amount of chromium trioxide less than required for 7 atoms of oxygen per mol of sclareol in glacial acetic acid solution for 30 hours at a temperature of about 40° C., products having an ambergris aroma are obtained in a yield exceeding 30%. The preferred procedure, however, consists in using as oxidizing agent, in place of chromium trioxide, an acid dichromate solution in an amount corresponding to 7 atoms of oxygen per mol of sclareol and, preferably, with an amount not exceeding an amount equivalent to 6 atoms of oxygen per mol of sclareol. Preferably, oxidation with dichromate is effected in a suitable solvent inert to the oxidizing agent whereby sclareol is protected against too aggressive an oxidation. When following said procedure and splitting off acetic acid from the resulting oxidation product, there are obtained, depending upon the reaction conditions, 35% and more of products having an ambergris aroma. By selecting these novel oxidation conditions it is possible to considerably suppress formation of the odorless γ-lactone so that it is obtained in a yield lower than that of the product of ambergris aroma and, usually does not exceed about 30%.

While the invention is not intended to be limited to any particular theory, it is believed that the new odoriferous product obtained on gentle oxidation of sclareol is not a single, chemically uniform compound but is a mixture of several oxygen containing components the constitution of which is not completely known. The crude reaction product contains a compound which is capable of splitting off acetic acid and, thereby, is converted into a product carrying a carbonyl group. That said new compound contains a carbonyl group, is demonstrated by its reaction with hydroxylamine. In contrast thereto, the oxidation product before acetic acid has been split off, is indifferent toward said carbonyl reagent.

The infrared spectrum of the distilled oxidation product also shows that the main portion of the odoriferous components consists of a carbonyl compound.

Although, heretofore, a number of chemically uniform compounds having ambergris aroma have been produced synthetically, our knowledge of the odoriferous components of ambergris itself is rather limited. The new and unknown product having ambergris aroma as produced according to the present invention represents a substitute of highest quality to be used in place of the odoriferous substances of ambergris and can be employed with great advantage in perfumery and cosmetics in all those instances where a slight flavor of ambergris is desired.

Furthermore it has been shown that the formation of compounds having an ambergris aroma by gentle oxidation of sclareol of the following Formula I is not limited to said starting material:

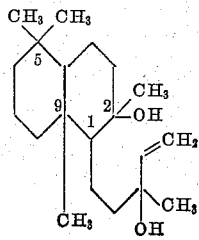

In general, all tetramethyl decahydronaphthalene derivatives having in each of the 2- and 9-positions a methyl group and in 5-position two geminate methyl groups and corresponding to the following Formula II form, on gentle oxidation by means of oxidizing agents yielding active oxygen, products having an ambergris aroma:

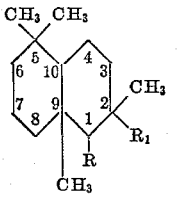

In said formula R and $R_1$ represent radicals of different kind. As far as the constitution of such compounds has been clarified, $R_1$ usually is a hydroxyl group or a group obtained therefrom by dehydration, and R is a hydrocarbon residue of varying composition and length. A technically important example is, for instance, the triterpene alcohol ambrein of the folowing Formula III:

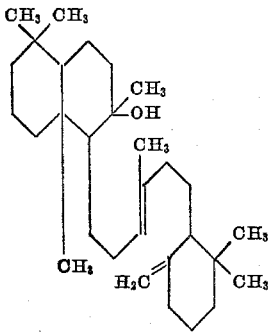

Such compounds are very comon in nature; for instance, manool of the following Formula IV which is quite similar in its constitution to sclareol and which is obtained from the wood of Dacrydium biforme or the neutral extracts of the wood of other Dacrydium plants, for instance, of Dacrydium Colensoi can be used with advantage as starting materials.

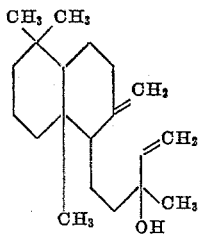

The following examples serve to illustrate the present invention without, however, limiting the same thereto.

*Example 1*

103 g. (0.33 mol) of sclareol of the melting point 104–105° C. are dissolved in 800 cc. of glacial acetic acid. A solution of 125 g. of chromium trioxide and 150 cc. of water in 1000 cc. of glacial acetic acid is added drop by drop to said solution in the course of 30 hours while stirring the reaction mixture vigorously. Said amount of chromium trioxide corresponds to 5.8 atoms of oxygen which are caused to react with 1 mol of sclareol. The reaction mixture is kept in a reaction vessel surrounded by a water bath heated to 40° C. The temperature rises at times about 10° C. above the bath temperature during the addition of chromium trioxide. As soon as the reaction is completed, the green solution is evaporated to dryness in a vacuum and 10% hydrochloric acid is gradually added to the evaporation residue until said residue is dissolved. The resulting solution is extracted several times with ether or benzene. The ether or benzene extract is washed with water until no more chloride ion can be detected. The extract may be washed with dilute sodium carbonate solution. This washing step, however, may be omitted since the organic acid present in the extract does not hinder further working up of said extract. On evaporating the ether or benzene, a viscous oxidation product is obtained in an amount of 90 g. If washing with dilute sodium carbonate solution was omitted, the product contains free organic acids. It contains saponifiable compounds which can be saponified in the cold or at elevated temperature by means of ethanolic potassium hydroxide solution. It does not react with hydroxylamine. It has a weak ambergris aroma which becomes more pronounced on storage with access of air.

When subjecting said crude oxidation product to slow decomposing distillation in a moderate vacuum of 10 mm., acetic acid is split off. Splitting off of acetic acid is considerably accelerated by distilling the crude mixture in a vacuum over a small amount of copper bronze. The collected distillate is then subjected to fractional distillation in a high vacuum. The first fraction distilling between 110° C. and 140° C. under a pressure of 0.05 mm. contains those compounds which have a pronounced ambergris aroma. 28 g. thereof are obtained corresponding to 27.2% of sclareol used for oxidation. Said first fraction reacts with hydroxylamine while the fractions boiling above 140° C./0.05 mm., do not react therewith and do not have a strong ambergris aroma. Spectrometric investigation of the compound reacting with hydroxylamine shows that it contains a free carbonyl group.

About the same results are obtained when oxidizing sclareol at a temperature of 60° C. for only 15 hours and, otherwise, proceeding in the same manner as described herein above. The yield of a fraction having a pronounced ambergris aroma amounts to about 30%.

In contrast hereto, a yield of less than 10% of products having such an ambergris aroma is obtained when subjecting sclareol to the action of chromiumtrioxide in an amount corresponding to 7 atoms of oxygen per mol of sclareol at a temperature of 40° C. for 30 hours.

*Example 2*

103 g. (0.33 mol) of sclareol of the melting point 104–105° C. are dissolved in 600 cc. of benzene. A solution of 232 g. of sodium dichromate in 550 cc. of water and 226 g. of concentrated sulfuric acid are gradually added to said solution at a bath temperature of 40° C. in the course of 2½ hours while stirring vigorously. The amount of sodium dichromate is calculated so that 7 atoms of oxygen react with 1 mol of sclareol. The reaction temperature rises to 50° C. within 30 minutes and gradually decreases to a temperature of 45° C. at the end of the addition of the dichromate solution. The mixture is then kept for 2 hours at 40° C. while stirring whereafter it is poured into 2 l. of ice water. The benzene layer separates readily from the aqueous layer and is washed with water until the aqueous phase is free of sulfate ions. The washed benzene solution is evaporated to dryness without previous extraction with dilute sodium carbonate solution since the organic acids formed during oxidation do not disadvantageously affect further working up of the oxidation product. 86 g. of a crude oxidation product are obtained. Said product is distilled in a moderate vacuum in the same manner as described hereinabove in example 1 whereby acetic acid is split off. On subsequent fractional distillation in a high vacuum, 34 g. of a fraction boiling between 110° C. and 140° C. at a pressure of 0.05 mm. are obtained. This fraction reacts with hydroxylamine. It has a strong odor reminiscent of that of ambergris. The yield amounts to 33% of the sclareol subjected to oxidation.

When carrying out the oxidation at a temperature below 40° C. the yield of the fraction boiling below 140° C./0.05 mm. and having an ambergris aroma, gradually and slowly decreases with the decrease in temperature while an increase in temperature up to 60° C. causes a continuous slight increase in yield.

Example 3

A solution of 165 g. of chromium trioxide in 100 cc. of water and 1000 cc. of glacial acetic acid is added to a solution of 103 g. (0.33 mol) of sclareol of the melting point 104–105° C. in 800 cc. of glacial acetic acid at a bath temperature of 50° C. in the course of 2½ hours while stirring vigorously. The amount of chromium trioxide corresponds to an amount equivalent to 3 atoms of active oxygen for 1 mol of sclareol. The resulting oxidation mixture is worked up as described hereinabove in Example 1. The yield of the fraction boiling between 110° C. and 140° C. at a pressure of 0.05 mm. amounts to 32% calculated for sclareol subjected to oxidation. Said fraction has a pronounced ambergris aroma.

Example 4

A solution of 166 g. of sodium dichromate in 300 cc. of water and 130 g. of concentrated sulfuric acid is added drop by drop to a solution of 103 g. (0.33 mol) of sclareol melting at 104–105° C. in 600 cc. of benzene at a temperature of 50° C. in the course of 2½ hours while stirring vigorously. The amount of sodium dichromate reacting with sclareol corresponds to an amount equivalent to 5 atoms of active oxygen per 1 mol of sclareol. The resulting oxidation mixture is worked up in the same manner as described in Example 2. The yield of the fraction having an ambergris aroma corresponds to 35% of the sclareol subjected to oxidation. Half of the new odoriferous fraction having an ambergris aroma consists of carbonyl compounds. When treating 100 g. of said product twice with Girard's carbonyl reagent T according to Girard and Sandulesco "Helvetica Chimica Acta", vol. 19, page 1095 (1936), there are obtained 55 g., corresponding to 53%, of a mixture of heretofore unknown, partly unsaturated carbonyl compounds which possess an agreeable, typical ambergris aroma. One of said carbonyl compounds even has the tendency to crystallize.

The fraction remaining after removing the compounds containing carbonyl groups, have only a slightly changed odor over that of the starting material, i.e. they also possess a very pronounced ambergris aroma. Said fraction comprises also oxygen containing compounds with functional groups of various kinds. One of said oxygen containing compounds can be characterized as a compound having a hydroxyl group by means of the method according to Th. Zerevitinoff and L. Chugaev for the determination of active hydrogen atoms.

100 g. of the crude oxidation product or 100 g. of the oxidation product which has already been purified by distillation are stirred vigorously with a 5% solution of potash and soda, in which case it is advisable to extract the oxidation mixture with a solvent of ether or benzene in order to avoid the formation of an emulsion. The salts of the organic acids contained in the aqueous soda solution are then mixed with acids which are stronger than those produced by the oxidation, such as, for example, sulphuric acid, hydrochloric acid, acetic acid, or formic acid, until an acid reaction with a pH-value corresponding to Congo-red has been attained. The separated acids are extracted with ether and, after the solvent has been expelled therefrom, they are further treated as described above.

When treating and washing the fraction remaining after removing the carbonyl compounds with cold dilute sodium carbonate solution, higher molecular organic acids are dissolved. They are recovered from their alkaline solution and amount to about 10% of the total fraction having an ambergris aroma. Said non-crystallizing carboxyl compounds form a mixture of compounds of different composition. Their constitution, however, has not yet been clarified.

When reducing the entire acid fraction by means of lithium aluminum hydride ($LiAlH_4$) to primary alcohols, there is obtained, on working up the reduction products and subjecting them to fractional distillation, a fraction boiling at 151–154° C./0.15 mm. and having an odor similar to ambergris. In this manner it is possible to produce said alcohols in a yield amounting to 25% of the total fraction having an ambergris aroma. The more atoms of active oxygen are caused to react per mol of sclareol, the higher is the content of carboxylic acids in the new product having ambergris aroma.

For reducing the acid mixture or the esters thereof, it is advisable to proceed by adding within a period of ½ hour and under vigorous stirring a mixture of 25 cc. of acid or ester which has been dissolved in 250 cc. of absolute ether drop-by-drop to a boiling solution of 12 g. of lithium aluminum hydride ($LiAlH_4$) in 500 cc. of absolute ether. Vice versa, the solution of lithium aluminum hydride may also be added to the acid or ester solution. Finally, on the reflux the mixture is boiled for ½ hour and then worked up. For destroying the lithium complex, it is best to proceed by adding 200 cc. of a saturated ammonium chloride solution to the reaction mixture while cooling the same with ice, by washing the ether solution which has been drawn off the precipitate with water until neutral, and after boiling off the solvent, subjecting the crude alcohol mixture to fractional distillation in a vacuum for further purifying the same. The yield (6 g.) of the fraction boiling between 151 and 154° C. in a vacuum of .15 mm. has a pronounced ambergris aroma. The lithium complex may also be destroyed by adding a 15% solution of sulphuric acid or by successive addition of 20 g. of acetic ester and 50 g. of water.

Example 4a 10 g. of an acid fraction are esterified in the customary manner with diazomethane. The crude ester is slowly mixed with 10 g. of sodium in 50 g. of boiling isoamyl alcohol or in the same quantity of ethyl alcohol, or butyl alcohol, whereupon the reaction mixture is boiled for 1 hour on the reflux. After cooling, the reduction mixture is slowly mixed with 200 g. of water. The precipitating crude alcohol is extracted in 100 g. of ether or benzene, petroleum ether, toluol, or gasoline as a neutral solvent, and washed with distilled water until the layer of solvent shows no longer an alkaline reaction. The purification of the alcohol mixture thus obtained is carried out by fractional distillation, wherein the yield of the fraction boiling between 151 to 154° C. in a vacuum of .15 mm. has a pronounced ambergris aroma.

Example 5

A solution of 100 g. of sodium dichromate in 180 cc. of water and 80 g. of concentrated sulfuric acid is added to a solution of 103 g. (0.33 mol) of sclareol of the melting point 104–105° C. in 600 cc. of benzene at a bath temperature of 40° C. within the course of 2½ hours while stirring. The amount of dichromate added corresponds to an amount equivalent to 3 atoms of oxygen per 1 mol of sclareol. The oxidation mixture is worked up in the same manner as described hereinabove in Example 2 in order to separate and remove the new product having ambergris aroma.

Said new oderiferous product contains 65% of carbonyl compounds which can be isolated from the oxidation mixture by means of Girard's carbonyl reagent T, slightly less than 10% of higher molecular acids, and about 20% of saponifiable compounds. The remainder are oxygen containing higher molecular compounds with unknown functional groups and of unknown constitution, which also have a very pronounced ambergris odor.

Example 6

A solution of 33 g. of sodium dichromate in 60 cc. of water and 27 g. of concentrated sulfuric acid is added to a solution of 103 g. (0.33 mol) of sclareol in 600 cc.

of benzene at 50° C. while stirring vigorously. The amount of dichromate added corresponds to an amount equivalent to 1 atom of active oxygen reacted with 1 mol of said diterpene glycol. The oxidation mixture is worked up in the same manner as described hereinbefore in Example 2. The resulting product having ambergris aroma contains 25% of carbonyl compounds, only traces of carboxylic acids, and 15% of saponifiable compounds in addition to a rather large amount of non-oxidized starting material.

*Example 7*

According to a special embodiment of the present invention it is possible to generate active oxygen from chromium trioxide in aqueous sulfuric acid solution. Thereby the procedure is as follows:

67 g. of chromium trioxide are dissolved in 170 cc. of water and 80 cc. of sulfuric acid. Said solution is added to a solution of 103 g. (0.33 mol) of sclareol in 600 cc. of benzene at a temperature of 40° C. in the course of 2½ hours while stirring vigorously. The chromium trioxide is calculated so as to yield 3 atoms of active oxygen per 1 mol of sclareol. The oxidation mixture is worked up in the same manner as described hereinabove in Example 2.

The resulting product which also has a pronounced ambergris aroma, differs from the product obtained according to Example 5, by its low content of carbonyl compounds which amount to only 40% while the sum total of carboxylic acids and saponifiable compounds amounts also to 40%.

Analogous results are achieved when carrying out the chromic acid oxidation without the addition of mineral acids or organic acids.

*Example 8*

Odoriferous products of ambergris aroma are also obtained by subjecting, in place of sclareol, manool derived from the wood of Dacrydium biforme which is related to sclareol in its constitution, to chromic acid oxidation in acid solution according to Examples 1 to 6. The procedure is preferably as follows:

97 g. (0.33 mol) of manool of the melting point 53° C. are dissolved in 600 cc. of benzene. A solution of 166 g. of sodium dichromate in 300 cc. of water and 130 g. of concentrated sulfuric acid is added to said manool solution at a bath temperature of 40° C. in the course of 2½ hours while stirring vigorously. The amount of sodium dichromate corresponds to an amount equivalent to 5 atoms of active oxygen per 1 mol of manool. The oxidation mixture is worked up as described hereinbefore in Example 2. The fraction which boils between 100° C. and 140° C. under a pressure of 0.1 mm. possesses an agreeable ambergris aroma. It is obtained in a yield amount of 35%.

*Example 9*

The benzene extract of the wood of Dacrydium Colensoi can also be subjected to oxidation as described in the preceding Example 8. Acids present in said benzene extract are preferably removed therefrom by shaking with dilute sodium carbonate solution.

100 g. of the neutral benzene extract are dissolved in 600 cc. of benzene. A solution of 170 g. of sodium dichromate in 300 cc. of water and 130 g. of concentrated sulfuric acid is added to said benzene solution at a temperature of 40° C. in the course of 2½ hours while stirring vigorously. The oxidation mixture is worked up in the same manner as described hereinbefore in Example 2. The fraction which boils between 130° C. and 170° C. under a pressure of 0.1 mm. represents the new odoriferous product having ambergris aroma. The yield is about 35%.

As explained hereinabove and shown in the preceding examples, the process according to the present invention is based upon the principle to carry out the oxidation of sclareol and related tetramethyl decahydronaphthalene compounds under such gentle conditions that no formation of substantial amounts of corresponding γ-lactones takes place and the formation of odoriferous oxidation by-products is considerably increased. To achieve this result, the starting material is either subjected to oxidation with chromium trioxide in glacial acetic acid solution in the presence of small amounts of water whereby the amount of chromium trioxide must be an amount equivalent to not more than 6 atoms of oxygen per 1 mol of sclareol or the like, or it is subjected to oxidation with chromium trioxide in aqueous acid solution whereby also amounts of chromium trioxide exceeding those amounts that are equivalent to 6 atoms of oxygen per 1 mol of sclareol or the like can be used since oxidation in such aqueous acid solution proceeds more gently than in glacial acetic acid solution.

As stated above, the ambergris aroma of the reaction products obtained by gentle oxidation of sclareol and the like can be considerably increased by splitting off acetic acid from the oxidation product, for instance, by prolonged storage on air and by vacuum distillation in the presence or absence of catalysts.

Splitting off of acetic acid takes place spontaneously, for instance, by allowing the oxidation mixture to stand for 1 to 30 days with access of air. The preferred method, however, is to subject the crude oxidation product to a decomposing distillation in a moderate vacuum, for instance, of 10 mm. pressure.

The pressure during decomposing distillation should not be higher than about 15 mm. Optimum decomposing distillation conditions are readily determined by a few preliminary distillation tests under various conditions of vacuum and distillation temperature. The speed with which said decomposing distillation is carried out is also of importance and optimum speed can readily be determined by preliminary tests.

Subsequently the distillate obtained on decomposing vacuum distillation is advantageously subjected to fractional distillation in a high vacuum, preferably at a pressure between about 0.01 mm. and about 1.0 mm. Ordinarily fractions distilling between about 100° C. and about 170° C. at said pressure yield the odoriferous products having ambergris aroma, while those below or above said temperature are practically odorless. It is, of course, quite simple to determine by preliminary tests for any given oxidation product the optimum range within which to collect the most odoriferous fraction.

As shown in Example 1, splitting off of acetic acid on vacuum distillation can be considerably accelerated by distilling the oxidation products over catalysts, such as copper bronze used in said example. Other catalysts, such as sebacic acid, myristic acid, copper bronze, brass bronze, aluminum oxide, active alumina, and the like can also be used. Only small amounts of said catalysts are required. Amounts between about 1% and about 5% of the weight of the oxidation products to be distilled have proved fully satisfactory.

The oxidation temperature is preferably between about 40° C. and about 60° C. Higher temperatures than 60° C. do not have any yield increasing effect. On the contrary, they tend to cause undesired decomposition and, therefore, should be avoided. Lower temperatures than 40° C. are also not recommended since they require too long a reaction duration. Furthermore, considerable amounts of unreacted starting material are recovered thereby.

The preferred inert solvent used when oxidizing with alkali dichromate is benzene. However, other aromatic hydrocarbons such as toluene or xylene, and other inert solvents such as petroleum ether, hexane, gasoline, dioxane, tetrahydrofuran, and the like may also be employed.

In place of lithium aluminum hydride used in Example 4 for the reduction of the acid fraction to primary alcohols, there can be used other reducing agents capable of reducing carboxylic acids to primary alcohols such as sodium metal under benzene, toluene, or xylene, in alcohol. In this case, however, it is advisable first to esterify with diazomethane the acid fraction to form, for instance, the corresponding ethyl esters and then to reduce said esters with sodium metal and absolute alcohol.

The preferred method, however, is the method of using lithium aluminum hydride and similar compounds. The acid fraction to be reduced is added to an ethereal solution of lithium aluminum hydride and the resulting alcoholate is hydrolyzed by means of an acid. Reduction takes place readily at room temperature.

Of course, many other changes and variations in the starting materials, the oxidizing agents, the oxidation conditions, temperature and duration, the decomposing distillation for the purpose of splitting off acetic acid, the fractional distillation for the separation of odoriferous fractions from non-odoriferous ones, the methods of working up the oxidation mixture, the distillate obtained on decomposing distillation, and its fractions, of separating and isolating carbonyl compounds, carboxylic acid fractions, and other fractions from the odoriferous part of the oxidation product, the conversion of the carboxylic acid fraction into primary alcohols, and the like may be made by those skilled in the art in accordance with the principles set forth herein and in the claims annexed thereto.

As stated above, the starting materials useful for the purpose of the present invention are 2,5,5,9-tetramethyl decahydronaphthalene compounds of the above given Formula II. Other compounds of this type than sclareol, ambrein, and manool employed in the preceding examples are, for instance, Manoyloxyd, Sclareoloxyd.

I claim:

1. In a process of producing oxygen containing products having ambergris aroma, the steps comprising gradually adding, while stirring, a solution of chromium trioxdie in acetic acid to a solution of sclareol in acetic acid at an elevated temperature not substantially exceeding 60° C., the amounts of chlorium trioxide added being equivalent to an amount not exceeding about 6 atoms of oxygen per 1 mol of sclareol, and recovering the odoriferous oxidation product having ambergris aroma from the oxidation mixture.

2. In a process of producing oxygen containing products having ambergris aroma, the steps comprising gradually adding, while stirring, a solution of chromium trioxide in acetic acid to a solution of sclareol in acetic acid at a temperature between about 40° C. and about 60° C., the amounts of chromium trioxide added being equivalent to an amount between about 3 atoms of oxygen and about 6 atoms of oxygen per 1 mol of sclareol, and recovering the odoriferous oxidation product having ambergris aroma from the oxidation mixture.

3. In a process of producing oxygen containing products having ambergris aroma, the steps comprising gradually adding, while stirring, an aqueous mineral acid solution of an alkali metal dichromate to a solution of sclareol in an organic solvent substantially not affected by the action of said alkali metal dichromate at an elevated temperature not substantially exceeding 60° C., the amount of alkali metal dichromate added not exceeding about 6 atoms of oxygen per 1 mol of sclareol, and recovering the odoriferous oxidation product having ambergris aroma from the oxidation mixture.

4. In a process of producing oxygen containing products having ambergris aroma, the steps comprising gradually adding, while stirring, a solution of an alkali metal dichromate in aqueous sulfuric acid to a solution of sclareol in benzene at a temperature between about 40° C. and about 60° C., the amount of alkali metal dichromate added being equivalent to an amount between about 3 atoms of oxygen and about 6 atoms of oxygen per 1 mol of sclareol, and recovering the odoriferous oxidation product having ambergris aroma from the oxidation mixture.

5. In a process of producing oxygen containing products having ambergris aroma, the steps comprising adding, while stirring, an aqueous mineral acid solution of an alkali metal dichromate to a solution of manool in an organic solvent substantially not affected by the action of said alkali metal dichromate at an elevated temperature not substantially exceeding 60° C., the amount of alkali metal dichromate added not exceeding about 6 atoms of oxygen per 1 mol of manool, continuing heating and stirring until formation of odoriferous products having ambergris aroma is substantially completed, and recovering said odoriferous oxidation product from the oxidation mixture.

6. In a process of producing oxygen containing products having ambergris aroma, the steps comprising adding, while stirring, an aqueous mineral acid solution of an alkali metal dichromate to a neutral benzene extract of the wood of Dacrydium Colensoi at an elevated temperature not substantially exceeding 60° C., the amount of alkali metal dichromate added not exceeding about 170 g. per 100 g. of the neutral benzene extract, continuing heating and stirring until formation of odoriferous products having ambergris aroma is substantially completed, and recovering said odoriferous oxidation product from the oxidation mixture.

7. In a process of producing oxygen containing products having ambergris aroma, the steps comprising gradually adding, while stirring, a solution of chromium trioxide in acetic acid to a solution of a 2,5,5,9-tetramethyl decahydronaphthalene compound selected from the group consisting of sclareol, manool, ambrein, sclareol oxide, and manoyl oxide in an organic solvent substantially not affected by the action of said chromium trioxide at an elevated temperature not substantially exceeding 60° C., the amounts of chromium trioxide added being equivalent to an amount not exceeding about 6 atoms of oxygen per 1 mol of said 2,5,5,9-tetramethyl decahydronaphthalene compound, and recovering the odoriferous oxidation product having ambergris aroma from the oxidation mixture.

8. In a process of producing oxygen containing products having ambergris aroma, the steps comprising gradually adding, while stirring, a solution of chromium trioxide in mineral acid to a solution of sclareol in benzene at a temperature between about 40° C. and about 60° C., the amount of chromium trioxide added being equivalent to an amount between about 3 atoms of oxygen and about 7 atoms of oxygen per 1 mol of sclareol, and recovering the odoriferous oxidation product having ambergris aroma from the oxidation mixture.

9. In a process of producing oxygen containing products having ambergris aroma, the steps comprising oxidizing a solution of a 2,5,5,9-tetramethyl decahydronaphthalene compound selected from the group consisting of sclareol, manool, ambrein, sclareol oxide, and manoyl oxide in an organic solvent substantially not affected by the oxidizing agent at an elevated temperature not substantially exceeding 60° C. by gradual addition of an oxidizing agent selected from the group consisting of chromium trioxide and an aqueous mineral acid solution of an alkali metal dichromate while stirring, the amount of said oxidizing agent added being equivalent to an amount not exceeding about 6 atoms of oxygen per 1 mol of said 2,5,5,9-tetramethyl decahydronaphthalene compound, to form oxidation products having ambergris aroma, subjecting the resulting oxidation products to fractional high vacuum distillation, collecting the fraction having ambergris aroma, separating the carboxylic acids present in said highly odoriferous fraction from the carbonyl compounds and other oxidation products, and reducing said carboxylic acids to primary alcohols by means of lithium aluminum hydride.

10. In a process of producing oxygen containing products having ambergris aroma, the steps comprising gradually adding, while stirring, an aqueous mineral acid solution of an alkali metal dichromate to a solution of a 2,5,5,9-tetramethyl decahydronaphthalene compound selected from the group consisting of sclareol, manool, ambrein, sclareol oxide, and manoyl oxide in an organic solvent substantially not affected by the action of said alkali metal dichromate at an elevated temperature not substantially exceeding 60° C., the amount of said alkali metal dichromate added being equivalent to an amount not exceeding about 6 atoms of oxygen per 1 mol of said 2,5,5,9-tetramethyl decahydronaphthalene compound, and recovering the odoriferous oxidation product having ambergris aroma from the oxidation mixture.

11. In a process of producing oxygen containing products having ambergris aroma, the steps comprising oxidizing a solution of a 2,5,5,9-tetramethyl decanhydronaphthalene compound selected from the group consisting of sclareol, manool, ambrein, sclareol oxide, and manoyl oxide in an organic solvent substantially not affected by the oxidizing agent at an elevated temperature not substantially exceeding 60° C. by gradual addition of an oxidizing agent selected from the group consisting of chromium trioxide and an aqueous mineral acid solution of an alkali metal dichromate while stirring, the amount of said oxidizing agent added being equivalent to an amount not exceeding about 6 atoms of oxygen per 1 mol of said 2,5,5,9-tetramethyl decahydronaphthalene compound, to form oxidation products having ambergris aroma, and subjecting the resulting oxidation products to a decomposing distillation to increase the ambergris aroma of the distillate.

12. The process according to claim 11, wherein decomposing distillation of the resulting oxidation product to increase the ambergris aroma of the distillate is carried out in a vacuum in the presence of a copper bronze catalyst.

References Cited in the file of this patent

UNITED STATES PATENTS 2,683,721     Schlesinger              July 13, 1954
2,809,996     Stoll                   Oct. 15, 1957

OTHER REFERENCES

Volmar et al.: Chem. Abstracts, vol. 22, p. 2031 (1928).
Ruzicka et al.: Helv. Chim. Acta 14, pp. 645–50 (1931).
Janot: Chem. Abstracts, vol. 26, p. 2452 (1932).
Stoll et al.: Helv. Chim. Acta, vol. 33, pp. 1251–1260 (1950).
Simonsen: The Terpenes (2d ed.) 1952, pp. 360–64, vol. III.
Schenk et al.: Chem. Abstracts, vol. 49, pp. 3900–01 (1955).